US012809761B2

(12) United States Patent
Ayyapureddi et al.

(10) Patent No.: US 12,809,761 B2
(45) Date of Patent: Nov. 24, 2026

(54) MEMORY DEVICE HAVING A MODE REGISTER FOR COLUMN SELECT SIGNAL SUPPRESSION

(71) Applicant: Micron Technology, Inc., Boise, ID (US)

(72) Inventors: Sujeet Ayyapureddi, Boise, ID (US); Gary Howe, Allen, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/916,497

(22) Filed: Oct. 15, 2024

(65) Prior Publication Data

US 2026/0104990 A1 Apr. 16, 2026

(51) Int. Cl.
*G06F 12/02* (2006.01)

(52) U.S. Cl.
CPC ................................ *G06F 12/0223* (2013.01)

(58) Field of Classification Search
None
See application file for complete search history.

(56) References Cited

U.S. PATENT DOCUMENTS

2010/0177587 A1 7/2010 Huang
2013/0227210 A1* 8/2013 Walker ................ G11C 7/1009 711/E12.001
2016/0172028 A1 6/2016 Park et al.
2017/0249097 A1 8/2017 Eguchi
2019/0103154 A1 4/2019 Cox et al.
2021/0057026 A1 2/2021 Sarpatwari et al.
2021/0064460 A1 3/2021 Jannusch et al.
2022/0084565 A1 3/2022 Prather et al.
2022/0270668 A1 8/2022 Li et al.
2022/0382628 A1 12/2022 Lam et al.
2023/0290428 A1* 9/2023 Fujiwara ............ G11C 11/4097
2024/0160524 A1 5/2024 Ayyapureddi et al.
2024/0161855 A1 5/2024 Smith et al.
2024/0161856 A1 5/2024 Smith et al.
(Continued)

FOREIGN PATENT DOCUMENTS

WO 2026084811 A1 4/2026

OTHER PUBLICATIONS

U.S. Appl. No. 18/916,521 titled "Apparatuses, Systems, and Methods for Storing Metadata in a Memory Device" filed Oct. 15, 2024, pp. all pages of the application as filed.
(Continued)

*Primary Examiner* — Hosain T Alam
*Assistant Examiner* — Ryan Dare
(74) *Attorney, Agent, or Firm* — Dorsey & Whitney LLP

(57) ABSTRACT

A bank of a memory device may be divided into column planes. Each column plane may be associated with column selects. In some examples, one or more physical column planes may be selectively configured to store metadata. Depending on the amount of metadata to be stored, the column selects may be arranged into virtual column planes to allow data to be stored in physical column plane(s) used for metadata. The physical column planes may be arranged into virtual planes to store the data. Column select signals for physical column planes may be suppressed to facilitate the virtual planes. Different suppression schemes may be used based on the amount of metadata stored.

18 Claims, 10 Drawing Sheets

(56) References Cited

U.S. PATENT DOCUMENTS

| | | | | |
|---|---|---|---|---|
| 2024/0272979 | A1* | 8/2024 | Ayyapureddi | G06F 11/1004 |
| 2024/0273014 | A1* | 8/2024 | Ayyapureddi | G06F 12/0223 |
| 2024/0289266 | A1 | 8/2024 | Ayyapureddi | |
| 2024/0312553 | A1 | 9/2024 | Ayyapureddi | |
| 2024/0404586 | A1 | 12/2024 | Kim et al. | |
| 2025/0061939 | A1 | 2/2025 | Kim et al. | |
| 2026/0079619 | A1* | 3/2026 | Ayyapureddi | G06F 3/0608 |
| 2026/0079640 | A1* | 3/2026 | Ayyapureddi | G06F 3/0655 |
| 2026/0079790 | A1* | 3/2026 | Ayyapureddi | G06F 11/1044 |
| 2026/0080968 | A1* | 3/2026 | Ayyapureddi | G11C 29/52 |
| 2026/0080969 | A1* | 3/2026 | Ayyapureddi | G11C 29/52 |
| 2026/0080970 | A1* | 3/2026 | Ayyapureddi | G11C 29/785 |
| 2026/0104963 | A1 | 4/2026 | Ayyapureddi et al. | |
| 2026/0104990 | A1* | 4/2026 | Ayyapureddi | G06F 12/0223 |
| 2026/0162753 | A1* | 6/2026 | Ayyapureddi | G11C 29/76 |
| 2026/0162754 | A1* | 6/2026 | Ayyapureddi | G11C 29/76 |
| 2026/0162755 | A1* | 6/2026 | Ayyapureddi | G11C 29/76 |
| 2026/0162756 | A1* | 6/2026 | Ayyapureddi | G11C 29/76 |

OTHER PUBLICATIONS

PCT Application No. PCT/US25/46221 titled "Apparatuses, Systems, and Methods for Storing Metadata in a Memory Device" filed Sep. 12, 2025, pp. all pages of the application as filed.

PCT Application No. PCT/US25/46235 titled "Apparatuses, Systems, and Methods for Storing Metadata in a Memory Device" filed Sep. 12, 2025, pp. all pages of the application as filed.

International Search Report & Written Opinion dated Dec. 24, 2025 for PCT Appl. No. PCT/US2025/046235; pp. all.

* cited by examiner

600

| | SWD0 | | SWD1 | | SWD2 | | SWD3 | | SWD4 | | SWD5 | | SWD6 | | SWD7 | | SWD8 | | SWD9 | | SWD10 |
|---|---|---|---|---|---|---|---|---|---|---|---|---|---|---|---|---|---|---|---|---|---|
| CA11 | 1 | 0 | 1 | 0 | 1 | 0 | 1 | | 0 | | | 1 | | 0 | 1 | 0 | 1 | 0 | 1 | 0 | |
| #CS | 56 | 56 | 56 | 56 | 56 | 56 | 56 | 60 | 60 | 16 | 64 | 56 | 60 | 56 | 56 | 56 | 56 | 56 | 56 | 60 | |
| CP | CP0 | CP1 | CP2 | CP3 | CP4 | CP5 | CP6 | MD0 | CP7 | GCR | ECC | CP8 | MD1 | CP9 | CP10 | CP11 | CP12 | CP13 | CP14 | CP15 | |
| CS | | | | | | | | | | | | | | | | | | | | | |
| 0:3 | CP0 | CP1 | CP2 | CP3 | CP4 | CP5 | CP6 | CP0 | CP7 | GCR | ECC | CP8 | CP8 | CP9 | CP10 | CP11 | CP12 | CP13 | CP14 | CP15 | |
| 4:7 | CP0 | CP1 | CP2 | CP3 | CP4 | CP5 | CP6 | CP1 | CP7 | GCR | ECC | CP8 | CP8 | CP9 | CP10 | CP11 | CP12 | CP13 | CP14 | CP15 | |
| 8:11 | CP0 | CP1 | CP2 | CP3 | CP4 | CP5 | CP6 | CP1 | CP7 | GCR | ECC | CP8 | CP9 | CP9 | CP10 | CP11 | CP12 | CP13 | CP14 | CP15 | |
| 12:15 | CP0 | CP1 | CP2 | CP3 | CP4 | CP5 | CP6 | CP2 | CP7 | GCR | ECC | CP8 | CP9 | CP9 | CP10 | CP11 | CP12 | CP13 | CP14 | CP15 | |
| 16:19 | CP0 | CP1 | CP2 | CP3 | CP4 | CP5 | CP6 | CP2 | CP7 | GCR | ECC | CP8 | CP10 | CP9 | CP10 | CP11 | CP12 | CP13 | CP14 | CP15 | |
| 20:23 | CP0 | CP1 | CP2 | CP3 | CP4 | CP5 | CP6 | CP3 | CP7 | GCR | ECC | CP8 | CP10 | CP9 | CP10 | CP11 | CP12 | CP13 | CP14 | CP15 | |
| 24:27 | CP0 | CP1 | CP2 | CP3 | CP4 | CP5 | CP6 | CP3 | CP7 | GCR | ECC | CP8 | CP11 | CP9 | CP10 | CP11 | CP12 | CP13 | CP14 | CP15 | |
| 28:31 | CP0 | CP1 | CP2 | CP3 | CP4 | CP5 | CP6 | CP4 | CP7 | GCR | ECC | CP8 | CP11 | CP9 | CP10 | CP11 | CP12 | CP13 | CP14 | CP15 | |
| 32:35 | CP0 | CP1 | CP2 | CP3 | CP4 | CP5 | CP6 | CP4 | CP7 | GCR | ECC | CP8 | CP12 | CP9 | CP10 | CP11 | CP12 | CP13 | CP14 | CP15 | |
| 36:39 | CP0 | CP1 | CP2 | CP3 | CP4 | CP5 | CP6 | CP5 | CP7 | GCR | ECC | CP8 | CP12 | CP9 | CP10 | CP11 | CP12 | CP13 | CP14 | CP15 | |
| 40:43 | CP0 | CP1 | CP2 | CP3 | CP4 | CP5 | CP6 | CP5 | CP7 | GCR | ECC | CP8 | CP13 | CP9 | CP10 | CP11 | CP12 | CP13 | CP14 | CP15 | |
| 44:47 | CP0 | CP1 | CP2 | CP3 | CP4 | CP5 | CP6 | CP6 | CP7 | GCR | ECC | CP8 | CP13 | CP9 | CP10 | CP11 | CP12 | CP13 | CP14 | CP15 | |
| 48:51 | CP0 | CP1 | CP2 | CP3 | CP4 | CP5 | CP6 | CP6 | CP7 | GCR | ECC | CP8 | CP14 | CP9 | CP10 | CP11 | CP12 | CP13 | CP14 | CP15 | |
| 52:55 | CP0 | CP1 | CP2 | CP3 | CP4 | CP5 | CP6 | CP7 | CP7 | GCR | ECC | CP8 | CP14 | CP9 | CP10 | CP11 | CP12 | CP13 | CP14 | CP15 | |
| 56:59 | | | | | | | | CP7 | CP7 | | ECC | | CP15 | | | | | | | CP15 | |
| 60:63 | | | | | | | | | | | ECC | | | | | | | | | | |

Not Assigned    Suppressed/Remapped

FIG. 6

800

MD8 ON

| | Binary Decode | | | | | | |
|---|---|---|---|---|---|---|---|
| CS | 5 | 4 | 3 | 2 | 1 | 0 | CP |
| 0:3 | 0 | 0 | 0 | 0 | 0 | 0 | 0 |
| 4:7 | 0 | 0 | 0 | 1 | 0 | 0 | 1 |
| 8:11 | 0 | 0 | 1 | 0 | 0 | 0 | 2 |
| 12:15 | 0 | 0 | 1 | 1 | 0 | 0 | 3 |
| 16:19 | 0 | 1 | 0 | 0 | 0 | 0 | 4 |
| 20:23 | 0 | 1 | 0 | 1 | 0 | 0 | 5 |
| 24:27 | 0 | 1 | 1 | 0 | 0 | 0 | 6 |
| 28:31 | 0 | 1 | 1 | 1 | 0 | 0 | 7 |
| 32:35 | 1 | 0 | 0 | 0 | 0 | 0 | 8 |
| 36:39 | 1 | 0 | 0 | 1 | 0 | 0 | 9 |
| 40:43 | 1 | 0 | 1 | 0 | 0 | 0 | 10 |
| 44:47 | 1 | 0 | 1 | 1 | 0 | 0 | 11 |
| 48:51 | 1 | 1 | 0 | 0 | 0 | 0 | 12 |
| 52:55 | 1 | 1 | 0 | 1 | 0 | 0 | 13 |
| 56:59 | 1 | 1 | 1 | 0 | 0 | 0 | 14 |
| 60:63 | 1 | 1 | 1 | 1 | 0 | 0 | X |

802

MD OFF

| | Binary Decode | | | | | | |
|---|---|---|---|---|---|---|---|
| CS | 5 | 4 | 3 | 2 | 1 | 0 | CP |
| 0:3 | 0 | 0 | 0 | 0 | 0 | 0 | 0,8 |
| 4:7 | 0 | 0 | 0 | 1 | 0 | 0 | 0,8 |
| 8:11 | 0 | 0 | 1 | 0 | 0 | 0 | 1,9 |
| 12:15 | 0 | 0 | 1 | 1 | 0 | 0 | 1,9 |
| 16:19 | 0 | 1 | 0 | 0 | 0 | 0 | 2,10 |
| 20:23 | 0 | 1 | 0 | 1 | 0 | 0 | 2,10 |
| 24:27 | 0 | 1 | 1 | 0 | 0 | 0 | 3,11 |
| 28:31 | 0 | 1 | 1 | 1 | 0 | 0 | 3,11 |
| 32:35 | 1 | 0 | 0 | 0 | 0 | 0 | 4,12 |
| 36:39 | 1 | 0 | 0 | 1 | 0 | 0 | 4,12 |
| 40:43 | 1 | 0 | 1 | 0 | 0 | 0 | 5,13 |
| 44:47 | 1 | 0 | 1 | 1 | 0 | 0 | 5,13 |
| 48:51 | 1 | 1 | 0 | 0 | 0 | 0 | 6,14 |
| 52:55 | 1 | 1 | 0 | 1 | 0 | 0 | 6,14 |
| 56:59 | 1 | 1 | 1 | 0 | 0 | 0 | 7,15 |
| 60:63 | 1 | 1 | 1 | 1 | 0 | 0 | MD0,MD1 |

FIG. 8

MEMORY DEVICE HAVING A MODE REGISTER FOR COLUMN SELECT SIGNAL SUPPRESSION

BACKGROUND

This disclosure relates generally to semiconductor devices, and more specifically to semiconductor memory devices. In particular, the disclosure relates to memory, such as dynamic random access memory (DRAM). Information may be stored in memory cells, which may be organized into rows (word lines) and columns (bit lines) of an array. Various types of information may be stored in the array, such as data, error correction code (ECC) data, and metadata. The data may be information provided by an external device (e.g., controller, processor, host system). The ECC data may provide information that may be used to detect and/or correct errors in the data. The metadata may provide information about the data, ECC data, the memory device, and/or a device in communication with the memory device (e.g., a controller).

DRAM users are increasingly utilizing metadata to supplement the data stored in the memory array. For example, metadata may be used to store a "poison bit" that indicates that the data associated with the metadata is erroneous and should be discarded and/or replaced by an external device (e.g., controller, host, and/or system on a chip). In another example, metadata may store a pointer to a storage location that may allow the external device to determine what location in the array to access the next associated data. In some applications, this may be analogous to a head and/or tail of a linked list. These are merely examples, and other uses of metadata are also possible.

Metadata may be stored in the memory array in one or more column planes. However, not all users want to use metadata. Further, some users want to store more metadata than other users. Accordingly, memory devices that can satisfy multiple user preferences are desired.

BRIEF DESCRIPTION OF THE DRAWINGS

FIG. 6 shows a table indicating organization of the bank of the memory array and physical column plane suppression scheme according to some embodiments of the present disclosure.

FIG. 8 shows tables of decoding schemes according to some embodiments of the present disclosure.

DETAILED DESCRIPTION

Figure 1:
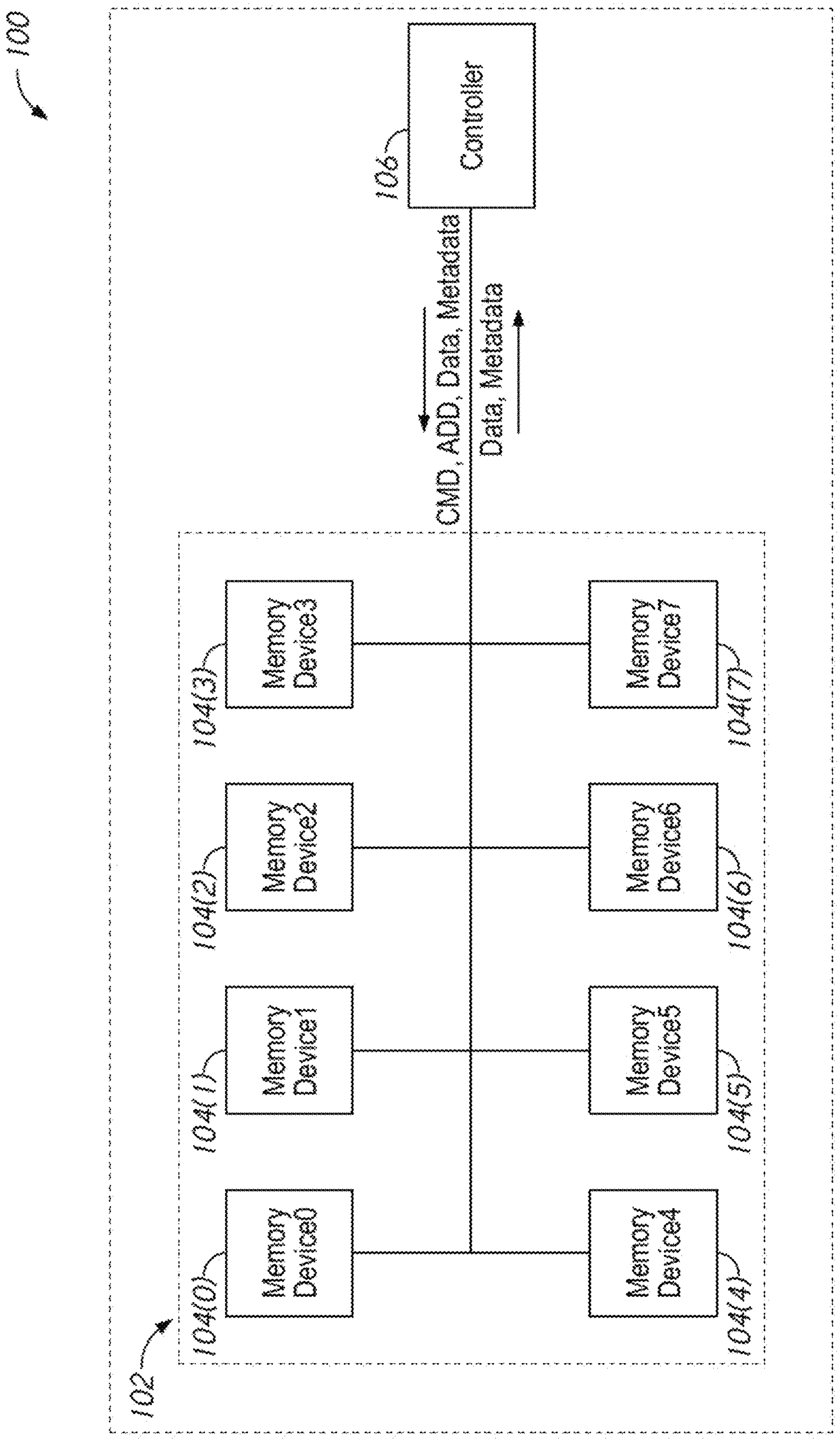
FIG. 1 is a block diagram of at least a portion of a computing system according to some embodiments of the present disclosure.

The following description of certain embodiments is merely exemplary in nature and is in no way intended to limit the scope of the disclosure or its applications or uses. In the following detailed description of embodiments of the present systems and methods, reference is made to the accompanying drawings which form a part hereof, and which are shown by way of illustration specific embodiments in which the described systems and methods may be practiced. These embodiments are described in sufficient detail to enable those skilled in the art to practice presently disclosed systems and methods, and it is to be understood that other embodiments may be utilized and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The following detailed description is therefore not to be taken in a limiting sense, and the scope of the disclosure is defined only by the appended claims.

Semiconductor memory devices may store information in multiple memory cells. The information may be stored as a binary code, and each memory cell may store a single bit of information as either a logical high (e.g., a "1") or a logical low (e.g., a "0"). The memory cells may be organized at the intersection of word lines (rows) and bit lines (columns) an array. The memory may further be organized into one or more memory banks. The banks may be organized into bank groups, where each bank group includes one or more banks. Each bank may include multiple of rows and columns. During operations, the memory device may receive a command and an address which specifies one or more rows and one or more columns and then execute the command on the memory cells at the intersection of the specified rows and columns (and/or along an entire row/column). The address may further specify the bank group and/or bank for execution of the command. In some applications, rows may be specified by 17-bit row addresses and columns may be specified by 12-bit column addresses. However, the number of bits used for the addresses may vary depending on the size and/or organization of the memory.

The columns may generally be organized into column planes, each of which includes a number of sets of individual columns all activated by a column select signal (CS) (e.g., column selects). Each bank may include some number X column planes. A column plane may receive some number N of column select (CS) signals, each of which may activate some number M of individual bit lines. As used herein, a column select set or CS set may generally refer to a set of bit lines which are activated by a given value of the CS signal within a column plane. The column select signal may be represented by (all or a portion of) a column address (CA). Responsive to a column select signal, data may be provided from corresponding locations from the column planes. The data from the column planes associated with the column select signal may be referred to as a prefetch s.

As discussed in the Background section, users may or may not want to store metadata in the memory array. Further, some users may want to store more metadata than other users. Some memory arrays may be capable of selectively storing or not storing metadata based on an operating mode, for example, as described in U.S. Provisional Patent Application Nos. 63/695,446, 63/695,458, 63/695,465, 63/695,472, 63/695,482, and 63/695,495 filed Sep. 17, 2024, which are incorporated herein by reference for any purpose. However, memory arrays that are further capable of storing different amounts of metadata in addition to not storing metadata are desired. This allows a user to change the amount of metadata stored without having to change memory devices. This may increase flexibility for the user and/or allow memory device manufacturers to provide a single memory device type that satisfies multiple user types.

According to embodiments of the present disclosure, a memory device may include a memory array that is selectively configurable (e.g., enabled) to store different amounts of metadata (e.g., none, 8 bits, and 16 bits per prefetch). In some embodiments, the memory array may include 16 column planes for data, two column planes for metadata, and a column plane for ECC data (total=19 CP). Optionally, some embodiments may additionally include a global column redundancy (GCR) plane. When storing a first amount of metadata (e.g., 16 bits) is enabled (e.g., by a mode register), in some embodiments, 14 of the data column planes are associated with 56 column select signals, 2 of the data column planes are associated with 60 column select signals, the metadata planes are associated with 60 column select signals, and the ECC data plane is associated with 64 column select signals (total=19 CP). When storing a second amount of metadata less than the first amount (e.g., 8 bits) is enabled, the column select signals may be activated in a manner such that the memory array operates as if there are sixteen data planes, one metadata plane, and an ECC data plane (total=18 CP). When storing metadata is disabled, the column select signals may be activated in a manner such that the memory array operates as if there are sixteen data planes and an ECC data plane (total=17 CP).

FIG. 1 is a block diagram of at least a portion of a computing system according to some embodiments of the present disclosure. The computing system 100 includes a memory module 102 and a controller 106 in communication with the memory module 102. In some embodiments, the controller 106 may be included in a processor (not shown) or in communication with the processor. The memory module 102 may include one or more memory devices 104. In the example shown in FIG. 1, there are eight memory devices 104(0-7). However, in other embodiments, there may be more or fewer memory devices (e.g., 4 devices, 16 devices). In some embodiments, additional memory devices 104 may be included to provide for redundancy. In some embodiments, memory module 102 may be a dual in-line memory module (DIMM). In some embodiments, what is shown in FIG. 1 may represent only half of the DIMM (e.g., one of the two channels). In other words, memory module 102 may include sixteen memory devices 104.

The controller 106 may provide commands, addresses, and/or data (e.g., data, metadata, or both) to one or more of the memory devices 104 and receive data from one or more of the memory devices 104. In some embodiments, memory devices 104 may be x4 or x8 memory devices. That is, either four or eight DQ terminals (e.g., pins) may be active. In some embodiments, the memory devices 104 may support both x4 and x8 operation. In some embodiments, whether the memory devices 104 operate in x4 or x8 mode may be based, at least in part, on values stored in mode registers (not shown in FIG. 1) of the memory devices 104. In some embodiments, the memory devices 104 may be x16 memory devices.

In some applications, each of the memory devices 104 may provide eight bits of metadata, for a total of four bytes of data. In some applications, each of the memory devices 104 may provide sixteen bits of metadata, for a total of eight bytes of data. The controller 106 may receive a prefetch from the memory devices 104 that include 128 bits of data and either 8 bits or 16 bits of metadata. In some embodiments, how much metadata is provided may be based on a value stored in the mode register of the memory device 104.

In some embodiments, whether or not metadata is stored at all may be based on a value stored in the mode register of the memory device 104. For example, when one value is stored in the mode register, 8 bits of metadata may be stored, when another value is stored in the mode register 16 bits of metadata may be stored, when a further value is stored in the mode register, metadata may not be stored. When this value is stored, all of the column selects are available for providing data to and from the array. Thus, a same memory may be utilized for applications where different amounts of metadata are desired was well as applications where metadata is not desired.

As will be described in more detail herein, when a first amount of metadata is stored, the physical column planes (e.g., physical planes) of the memory devices 104 associated with data and metadata are accessed by activating the corresponding column select signals for the physical column planes. When a second amount of metadata is stored or when metadata is not stored, the memory devices 104 may configure the column select signals to be activated in a manner to form a number of virtual column planes (e.g., virtual planes) to access metadata and/or data. In some embodiments, the number of virtual planes may be less than the number of data and metadata physical planes (e.g., 16 data+2 metadata=18 total physical planes vs. 17 or 16 total virtual planes). In some embodiments, the number of bit lines activated on the virtual planes may be equal to the number of bits lines activated in the physical planes during a memory access operation. By "virtual planes" it is meant that column select signals may be activated or suppressed in a manner that does not correspond to the physical planes of the memory array of the memory device 104. However, from the viewpoint of controller 106, the memory devices 104 may receive and output data and/or metadata as if the virtual planes were physical column planes.

Figure 2:
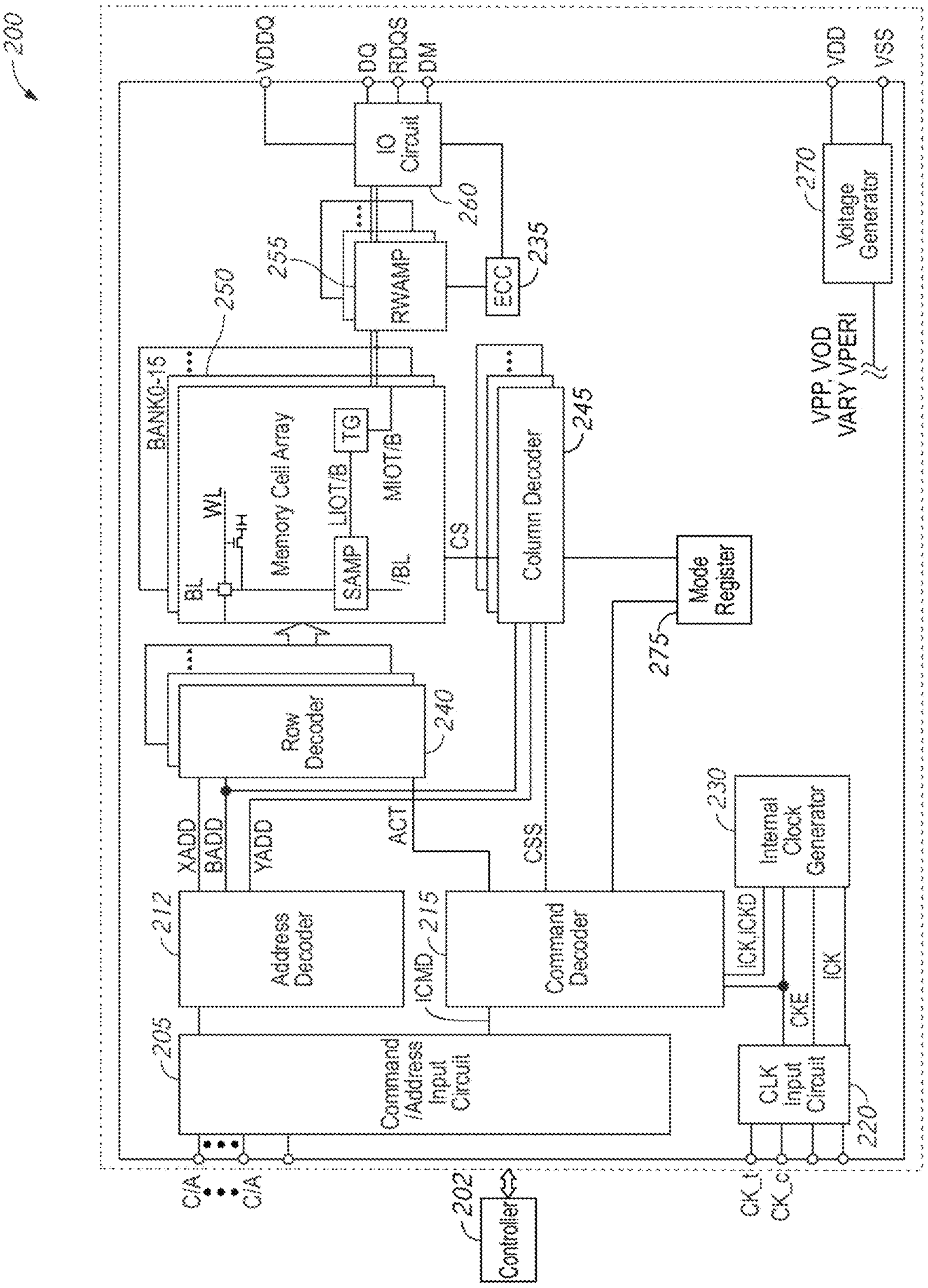
FIG. 2 is a block diagram of a semiconductor device according to some embodiments of the present disclosure.

FIG. 2 is a block diagram of a semiconductor device according to some embodiments of the present disclosure. The apparatus may be a semiconductor device, which may be a memory device 200, and will be referred as such. In some embodiments, the memory device 200 may include, without limitation, a dynamic random access (DRAM) device integrated into a single semiconductor chip. In some examples, the DRAM may be a double data rate (DDR) memory. In some embodiments, one or all of the memory devices 104(0-7) of FIG. 1 may include memory device 200.

The memory device 200 may be included on a die. The die may be mounted on an external substrate, for example, a memory module substrate, a mother board or the like (e.g., package-on-package (POP)). The memory device 200 may include a memory array 250. The memory array 250 includes a plurality of banks BANK0-15, each bank including a plurality of word lines WL, a plurality of bit lines BL, and a plurality of memory cells MC arranged at intersections of the plurality of word lines WL and the plurality of bit lines BL. Although sixteen banks are shown in FIG. 2, memory array 250 may include any number of banks. The selection of the word line WL is performed by a row decoder 240 and the selection of the bit line BL is performed by a column decoder 245. Sense amplifiers (SAMP) are located for their corresponding bit lines BL and connected to at least one respective local I/O line pair (LIOT/B), which is in turn coupled to at least respective one main I/O line pair (MIOT/B), via transfer gates (TG), which function as switches. The TG may be coupled to one or more read/write amplifiers (RWAMP) 255, which may be coupled to an error correction code (ECC) circuit 235. The ECC circuit 235 may be coupled to an IO circuit 260, which may be coupled to one or more external terminals of memory device 200. Read data from the bit line BL is amplified by the sense amplifier SAMP, and transferred to read/write amplifiers 255 over complementary local data lines (LIOT/B), transfer gate (TG), and complementary main data lines (MIOT/B) to the ECC circuit 235. Conversely, write data outputted from the ECC circuit 235 is transferred to the sense amplifier SAMP over the complementary main data lines MIOT/B, the transfer gate TG, and the complementary local data lines LIOT/B, and written in the memory cell MC coupled to the bit line BL.

The memory device 200 may employ a plurality of external terminals that include command and address terminals coupled to a command/address (C/A) bus to receive command and address signals, clock terminals to receive clock signals CK_t and CK_c, data terminals DQ, RDQS, and power supply terminals VDD, VSS, VDDQ, and VSSQ.

The C/A terminals may be supplied with an address and a bank address signal from outside, for example, from a controller 202. The address signal and the bank address signal supplied to the address terminals are transferred, via a command/address input circuit 205, to an address decoder 212. The address decoder 212 receives the address signals and supplies a decoded row address signal XADD to the row decoder 240, and a decoded column address signal YADD to the column decoder 245. The address decoder 212 also receives the bank address signal BADD and supplies the bank address signal to the row decoder 240 and the column decoder 245.

The C/A terminals may further be supplied with command signals from, for example, a controller 202. In some embodiments, controller 202 may be implemented or included in controller 106. The command signals may be provided as internal command signals ICMD to a command decoder 215 via the command/address input circuit 205. The command decoder 215 includes circuits to decode the internal command signals ICMD to generate various internal signals and commands for performing operations, for example, a row activation signal (ACT) to select a word line. Another example may be providing internal signals to enable circuits for performing operations, such as control signals to enable signal input buffers that receive clock signals.

Each bank BANK0-15 may be organized into multiple physical column planes (CP). Each column plane may be associated with multiple column selects (e.g., CS0-63, CS0-59, CS0-55). In some embodiments, different column planes may be used to store different types of information. For example, some column planes may store data and another plane stores ECC data. Optionally, a further plane may store GCR data. According to embodiments of the present disclosure, the array 250 can be selectively configured to utilize one or more column planes to store metadata.

The C/A terminals may receive an access command which is a read command. When a read command is received, and a bank address, a row address and a column address are timely supplied with the read command, a codeword including read data, metadata, and read ECC data (e.g., parity bits) is read from memory cells in the memory array 250 corresponding to the row address and column address. The read command is received by the command decoder 215, which provides internal commands so that read data from the memory array 250 is provided to the ECC circuit 235. The ECC circuit 235 may use the parity bits in the codeword to determine if the codeword includes any errors, and if any errors are detected, may correct them to generate a corrected codeword (e.g., by changing a state of the identified bit(s) which are in error). The corrected codeword (without the parity bits) is output from the data terminals DQ via the input/output circuit 260.

The C/A terminals may receive an access command which is a write command. When the write command is received, and a bank address, a row address, and a column address are timely supplied as part of the write operation, and write data is supplied through the DQ terminals to the ECC circuit 235. The write data (which may include write data and metadata) supplied to the data terminals DQ is written to a memory cells in the memory array 250 corresponding to the row address and column address. The write command is received by the command decoder 215, which provides internal commands so that the write data is received by data receivers in the input/output circuit 260. The write data is supplied via the input/output circuit 260 to the ECC circuit 235. The ECC circuit 235 may generate ECC data (e.g., a number of parity bits) based on the write data, and the write data and the parity bits may be provided as a codeword to the memory array 250 to be written into the memory cells MC.

The ECC circuit 235 may be used to ensure the fidelity of the data read from a particular group of memory cells to the data written to that group of memory cells. The memory device 200 may include a number of different ECC circuits 235, each of which is responsible for a different portion of the memory cells MC of the memory array 250. For example, there may be one or more ECC circuits 235 for each bank of the memory array 250. Typically, each bank BANK0-15 includes a column plane for the storage of ECC data (e.g., parity bits) and additional column planes for the storage of data (e.g., sixteen column planes). In these applications, the ECC circuit 235 generates eight bits of ECC data (e.g., 8 bits of ECC data) for each prefetch of 128 bits. This may allow for the ECC circuit 235 to provide single bit error correction.

The command decoder 215 may access mode register 275 that is programmed with information for setting various modes and features of operation for the memory device 200. For example, the mode register 275 may provide parameters that allow the memory device 200 to operate at different frequencies, provide different burst lengths, allow banks BANK0-15 to be organized into different groups, operate in x4, x8, or x16 mode, and/or other different operating conditions. In some embodiments, mode register 275 may include multiple registers.

The information in the mode register 275 may be programmed by providing the memory device 200 a mode register write command, which causes the memory device 200 to perform a mode register write operation. In some embodiments, data to be written to the mode register 275 is provided via the C/A terminals and/or the DQ terminals. The command decoder 215 accesses the mode register 275, and based on the programmed information along with the internal command signals provides the internal signals to control the circuits of the memory device 200 accordingly. Information programmed in the mode register 275 may be externally provided by the memory device 200 using a mode register read command, which causes the memory device 200 to access the mode register 275 and provide the programmed information (e.g., to the memory controller 202). In some embodiments, the information may be provided via the C/A terminals and/or the DQ terminals.

According to embodiments of the present disclosure, the mode register 275 may be programmed with a value that determines an amount of metadata stored in the memory device 200. When one value is stored in the register, no metadata may be stored (e.g., an operating mode where metadata is disabled). When another value is stored in the register, an amount of metadata may be stored, and when a further value is stored in the register, a different amount of metadata may be stored (e.g., operating modes where metadata is enabled). For example, the memory device 200 may have a mode where 16 bits of metadata are stored per prefetch (MD16 ON), a mode where 8 bits of metadata are stored per prefetch (MD8 ON), and a mode where no metadata is stored (MD OFF).

Based on the values stored in the mode register 275, the mode register may provide one or more signals to the column decoder 245. In some embodiments, the signals from the mode register 275 may enable or disable one or more decoder circuits (or one or more components thereof). The decoder circuits may determine which column select signals are activated and/or physical column planes are accessed during an access operation (e.g., read or write operations).

According to embodiments of the present disclosure, selectively activating or suppressing column select signals associated with one or more physical column planes may allow the formation of virtual column planes. This may allow the memory device 200 to appear to the controller 202 to have a number of column planes different than a number of physical column planes in the array 250.

Turning to the explanation of the external terminals included in the memory device 200, the clock terminals and data clock terminals are supplied with external clock signals and complementary external clock signals. The external clock signals CK_t, CK_c may be supplied to a clock input circuit 220. When enabled, input buffers included in the clock input circuit 220 pass the external clock signals. For example, an input buffer passes the CK_t and CK_c signals when enabled by a CKE signal from the command decoder 215. The clock input circuit 220 may use the external clock signals passed by the enabled input buffers to generate internal clock signal ICK. The internal clock signal ICK are supplied to internal clock circuit 230 for providing one or more clock signals to the various components of memory device 200.

The internal clock circuits 230 includes circuits that provide various phase and frequency controlled internal clock signals based on the received internal clock signals. For example, the internal clock circuits 230 may include a clock path (not shown in FIG. 2) that receives the ICK clock signal and provides internal clock signals ICK and ICKD to the command decoder 215. Optionally, the input/output circuit 260 may include clock circuits and driver circuits for generating and providing the RDQS signal to a controller.

The power supply terminals are supplied with power supply potentials VDD and VSS. These power supply potentials VDD and VSS are supplied to an internal voltage generator circuit 270. The internal voltage generator circuit 270 generates various internal potentials VPP, VOD, VARY, VPERI, and the like and a reference potential ZQVREF based on the power supply potentials VDD and VSS. The internal potential VPP is mainly used in the row decoder 240, the internal potentials VOD and VARY are mainly used in the sense amplifiers included in the memory array 250, and the internal potential VPERI is used in many other circuit blocks.

The power supply terminal is also supplied with power supply potential VDDQ. The power supply potentials VDDQ is supplied to the input/output circuit 260 together with the power supply potential VSS. The power supply potential VDDQ may be the same potential as the power supply potential VDD in an embodiment of the disclosure. The power supply potential VDDQ may be a different potential from the power supply potential VDD in another embodiment of the disclosure. However, the dedicated power supply potential VDDQ is used for the input/output circuit 260 so that power supply noise generated by the input/output circuit 260 does not propagate to the other circuit blocks.

Figure 3:
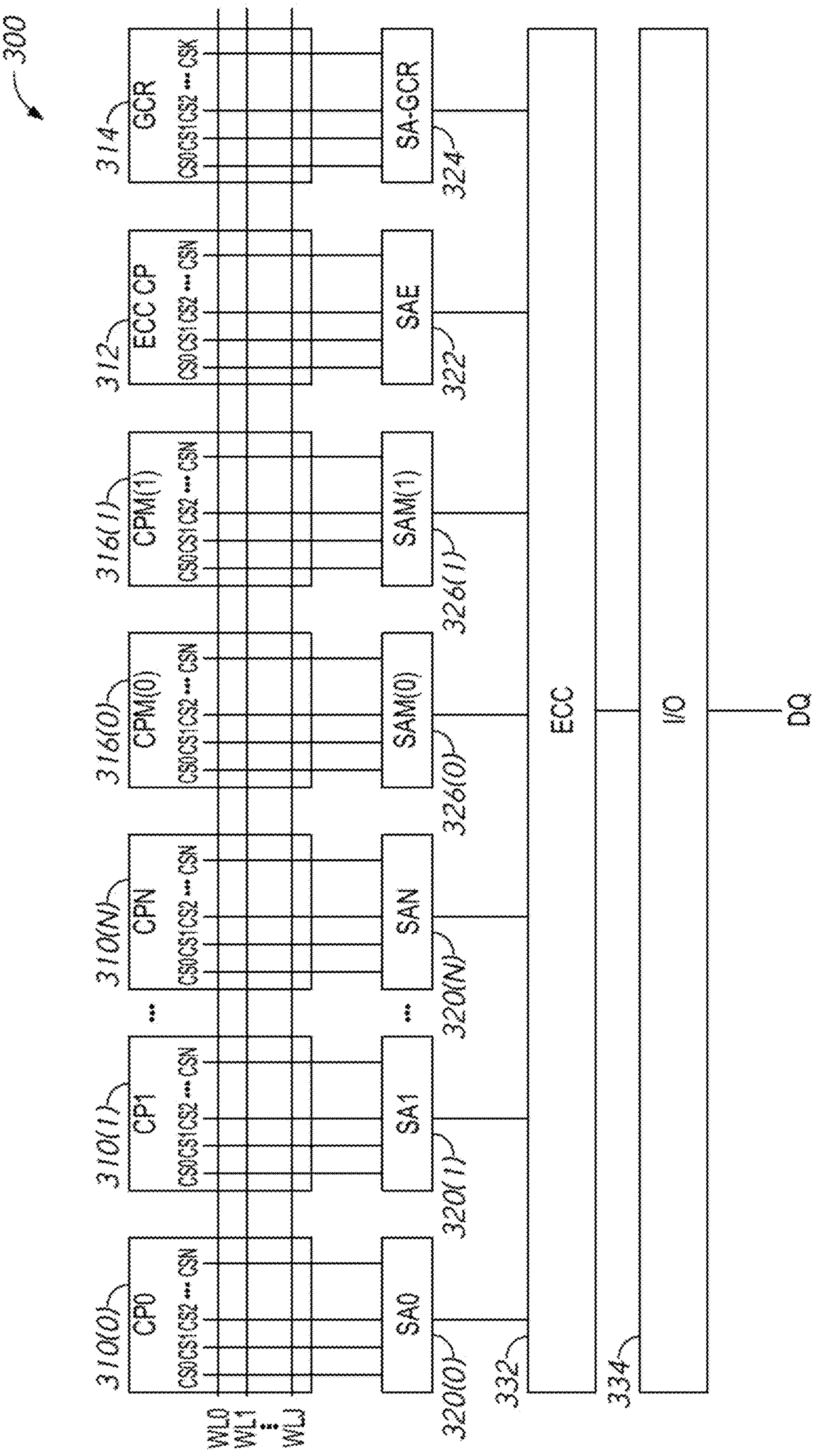
FIG. 3 is a block diagram of a portion of a memory device according to some embodiments of the present disclosure.

FIG. 3 is a block diagram of a portion of a memory device according to some embodiments of the present disclosure. The memory device 300 may, in some embodiments, represent a portion of the memory device 200 of FIG. 2 and/or a portion of one or more of the memory devices 104 in FIG. 1. FIG. 3 shows a portion of a memory array 310-316 and 320-326 which may be part of a memory bank (e.g., BANK0-15 of FIG. 2) along with selected circuits used in the data path such as the ECC circuit 332 (e.g., 235 of FIG. 2) and IO circuits 334 (e.g., 260 of FIG. 2). For clarity certain circuits and signals have been omitted from the view of FIG. 3.

The memory device 300 is organized into a number of column planes 310-316. Each of the column planes represents a portion of a memory bank. Each column plane 310-316 includes a number of memory cells at the intersection of word lines WL and bit lines. The bit lines may be grouped together into sets which are activated by a value of a column select (CS) signal. For the sake of clarity, only a single vertical line is used to represent the bit lines of each column select set, however, there may be multiple columns accessed by that value of CS. For example, each line may represent eight bit lines, all accessed in common by a value of CS. As used herein, a 'value' of CS may refer to a decoded signal provided to sets of bit lines (e.g., from a column decoder such as 245 in FIG. 2). A first value may represent a first value of a multibit CS signal, or after decoding a signal line associated with that value being active. The word lines may be extended across multiple of the column planes 310-316.

The memory device 300 includes a set of column planes 310 that store data and column planes 316 that stores metadata. The memory device 300 may include an ECC column plane 312 to store ECC information, such as error correction parity bits.

In some embodiments, the memory device 300 may also include an optional global column redundancy (GCR) column plane 314. In some embodiments, the GCR column plane 314 may have fewer memory cells (e.g., fewer column select groups) than the data column planes 310. The GCR CP 314 includes a number of redundant columns which may be used as part of a repair operation. If a value of the CS signal is identified as including defective memory cells in one of the data column planes 310, then the memory may be remapped such that the data which would have been stored in that column plane for that value of CS is instead stored in the GCR CP 314.

In the example shown in FIG. 3, the memory device 300 may include 16 data column planes 310(0)-310(15) and two metadata column planes 316(0)-316(1). Fourteen of the data column planes 310 each include 56 sets of column selects activated by a value of the column select signal and two of the data column planes 310 each include 60 sets of column selects activated by a value of the column select signal. Each of the metadata column planes 316 include 60 sets of column selects activated by a value of the column select signal (e.g., total of 1024 column selects). Each set of column select includes 8 bit lines.

When the memory device 300 is in an operating mode where both metadata planes 316 are utilized for storing metadata, when a word line is opened responsive to a row address, and a column select signal is provided to each of the 18 column planes then 8 bits are accessed from each of the 18 column planes for a total of 144 bits (128 data bits and 16 metadata bits). A column select signal is also provided to the ECC column plane 312, although that column select signal may be a different value than the one provided to the column planes 310 for an additional 8 bits. If a repair has been performed, the GCR CP 314 may also be accessed and the value on a GCR LIO may be used while ignoring the LIO of the column plane it is replacing. Accordingly, the maximum number of bits that can be retrieved as part of an access pass is 128 bits from the data column planes 310 (with 8 bits substituted from the GCR CP 314 if there has been a repair) along with 16 bits from the metadata column planes 316 and 8 additional bits from the ECC CP 312.

During read operations, data may be provided from the column planes 310 to the sense amplifiers 320 to the ECC circuit 332. Metadata may be provided from column planes 316 to sense amplifiers 326 and ECC data may be provided from column plane 312 to sense amplifier 322 to the ECC circuit 332. (If a repair has been made, data may also be provided from column plane 314 to sense amplifier 324 to the ECC circuit 332.) The ECC circuit 332 may use the ECC data provided from column plane 312 to correct and/or detect errors in the data and/or metadata. The ECC circuit 332 may output the data and metadata (corrected, if needed) to the I/O circuit 334. The I/O circuit 334 may provide the data and metadata to the DQ. The DQ may make the data and metadata to an external device (e.g., a controller such as 106 in FIGS. 1 and/or 202 in FIG. 2). Optionally, the ECC circuit 332 may further provide error information for output on the DQ.

During write operations, data and metadata may be received by the I/O circuit 334 from the DQ and provide the data and metadata to the ECC circuit 332. Optionally, error information may also be received and provided to the ECC circuit 332. The ECC circuit 332 may generate parity bits and/or other error correction information for the data and metadata. The ECC circuit 332 may provide the data to sense amplifiers 320 for storage in column planes 310. Metadata may be provided to sense amplifiers 326 for storage in column planes 316 and the error correction information may be provided to sense amplifier 322 for storage in column plane 312. (If a repair has been made, data may also be provided from the ECC circuit 332 to sense amplifier 324 for storage in column plane 314.)

When the memory device 300 is in an operating mode that uses only one of the metadata planes 316 to store metadata, the other one of the metadata planes 316 may be used to store data instead of metadata. As described herein, the activation of the column selects may be modified to form virtual planes from the column planes 310 and one of the metadata planes 316. When the memory device 300, is in an operating mode where the memory device 300 does not store metadata, the activation of the column selects may be modified to form virtual planes from column planes 310 and both metadata planes 316. The number of virtual planes may be equal to the number of data column planes 310 in some embodiments.

Figure 4:
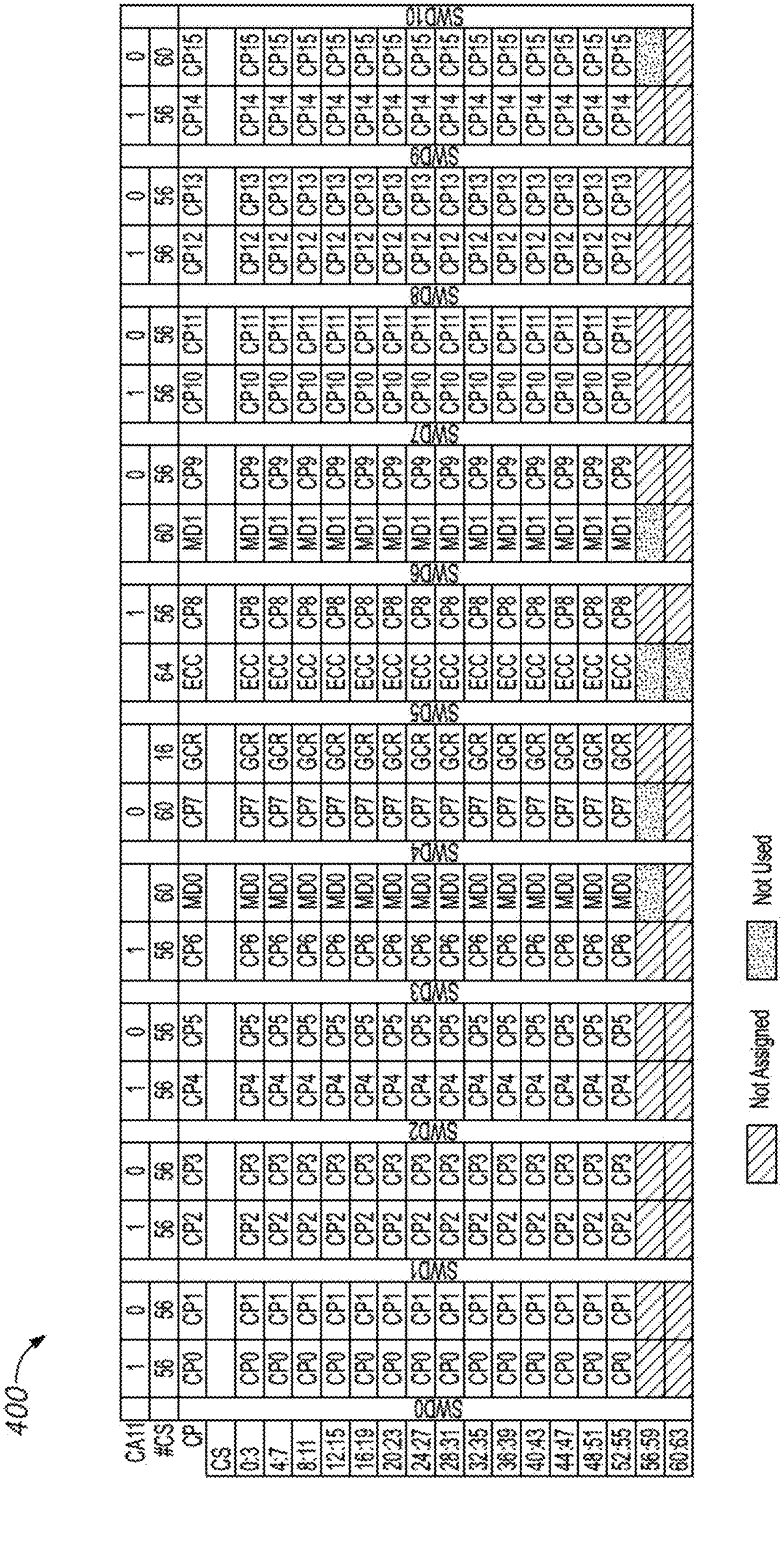
FIG. 4 shows a table indicating organization of a bank of a memory array according to some embodiments of the present disclosure.

FIG. 4 shows a table indicating organization of a bank of a memory array according to some embodiments of the present disclosure. The organization depicted in table 400 may be used when a memory device (e.g., one or more of memory devices 104 and/or memory device 200) is in an operating mode where two column planes are utilized to store metadata. In some embodiments, 16 bits of metadata may be stored per prefetch (MD16 ON). In some embodiments, 8 bits for each prefetch may be stored in each of the metadata planes.

The top row of table 400 indicates a value of column address bit 11 (CA11). In some embodiments, when the memory device 300 is operated in x8 mode, all of the data column planes provide data to the DQ, regardless of the value of CA11. When the memory device 300 is operated in x4 mode, only half of the data column planes provide data to the DQ. Which column planes provide data in x4 mode is based on the value of CA11. In the example shown in table 400, the even numbered column planes (CP0, CP2, etc.) provide data when CA11 is equal to 1, and the odd numbered column planes (CP1, CP3, etc.) provide data when CA11 is equal to 0. In other examples, other combinations of column planes may provide data responsive to the values of CA11.

The next row indicates the number of column selects (#CS) associated with each physical plane. The row just below indicates the physical column planes (CP). There is a total of 1,024 CS for data and metadata column planes. In the example shown in FIG. 4, 56 CS are associated with data CP0-6 and CP8-14 and 60 CS are associated data CP7 and CP15. In other examples, different column planes may be assigned 60 CS instead of CP7 and/or CP15. Sixty CS are also associated with metadata planes MD0 and MD1. Sixty-four CS are associated with the ECC data plane ECC, and 16 CS are associated with the global column redundancy plane GCR.

Below the top three rows are several columns providing more details on the organization of the data in the memory array. The first column indicates the column selects (CS). The vertical bars separating columns indicate the locations of subword line drivers (SWD0-10) relative to the physical column planes. The remaining columns of table 400 indicate the column select signals (CS) associated with the physical column planes. For certain column planes, CS56:59 and/or CS60:63 are not assigned because only 56 or 60 CS are assigned to the column planes (e.g., CP0-6 and CP8-14). In the operation mode where two column planes are utilized for metadata, CP56:59 and/or CS60:63 are not used (e.g., MD0, MD1, CP7, CP15, and ECC). That is, the CS exist and are assigned to the given column plane but are not used in this particular memory operation mode.

In the operation mode where two column planes are utilized for metadata, the memory device operates in a manner where all data types are stored in the physical array they are associated with, and virtual planes are not used. This is indicated by all of the columns indicating that all of the CS signals are associated with data for the column plane in which they are located. Accordingly, no column select signals are selectively suppressed.

Figure 5:
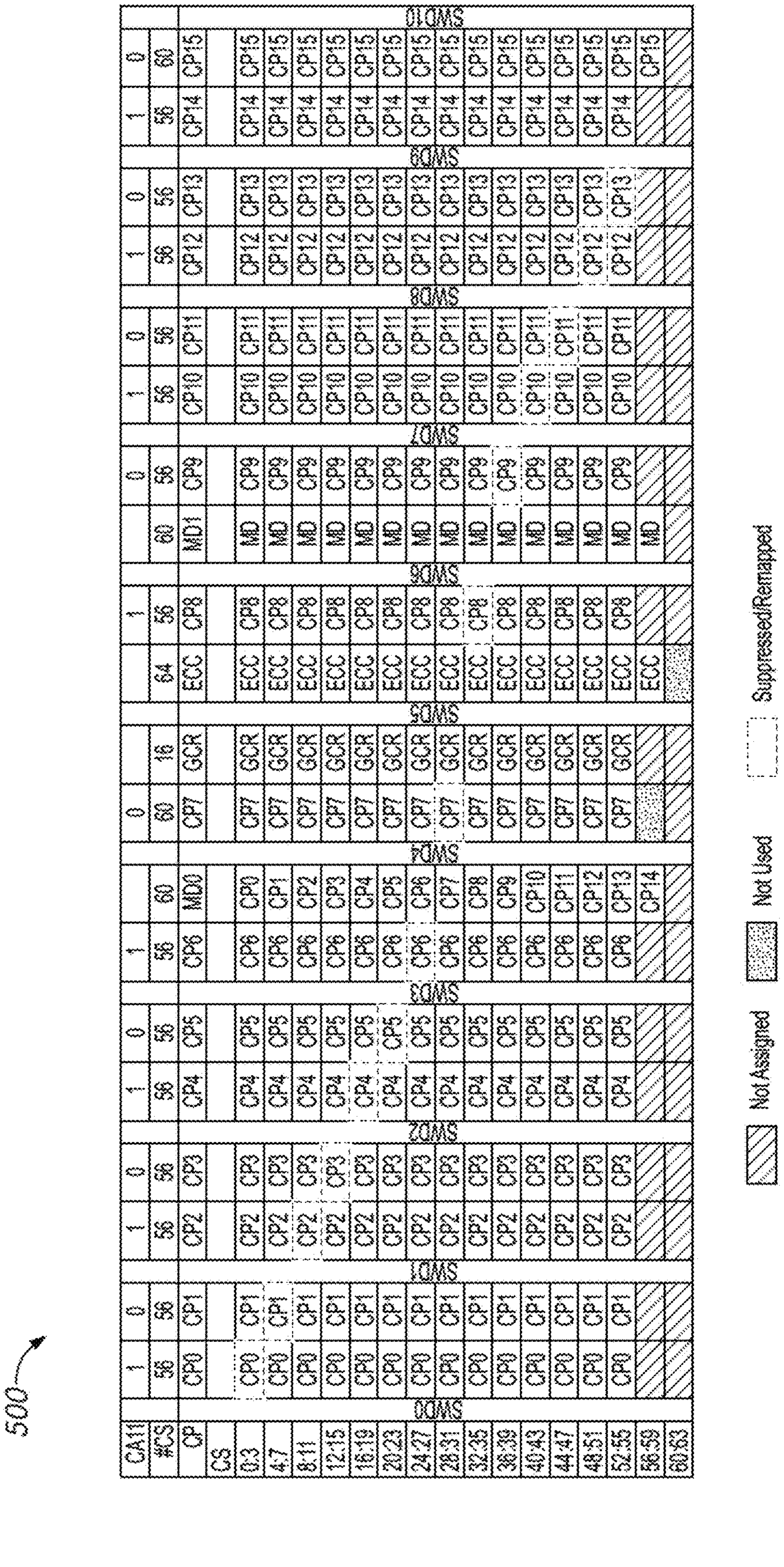
FIG. 5 shows a table indicating organization of the bank of the memory array and physical column plane suppression scheme according to some embodiments of the present disclosure.

FIG. 5 shows a table indicating organization of the bank of the memory array and physical column plane suppression scheme according to some embodiments of the present disclosure. The organization depicted in table 500 may be used when a memory device (e.g., one or more of memory devices 104 and/or memory device 200) is in an operating mode where one column plane is utilized to store metadata. In some embodiments, 8 bits of metadata may be stored per prefetch (MD8 ON).

The first three rows in table 500 are the same as table 400. The first column of table 500 is also the same as table 400. However, there are some differences in unused column selects between the tables. As shown, CS56:59 is now used by MD0, ECC, MD1, and CP15. Similar to table 400, CS56:59 is still not used by CP7, and CS60:63 is not used by ECC.

When less metadata is stored in the memory device, more space in the memory array is available for storing data. However, because of the allocation of the column selects, additional data cannot be stored in the physical data column planes. Rather, the additional data is stored in one of the metadata planes. In the example shown in FIG. 5, the additional data is stored in MD0. In order for a controller (e.g., controller 106, controller 202) to receive the data and metadata expected (e.g., 128 data bits and 8 metadata bits), the activation of the column selects are adjusted to form 16 virtual data planes (virtual planes) each associated with 60 CS. In the example shown, MD0 "lends" a set of column select signals to each of the virtual data planes CP0-14. For example, CS0:3 of MD0 is "borrowed" by virtual CP0, CS4:7 is borrowed by virtual CP1, and so on.

During operation, the column select signals for one or more physical column planes may be suppressed in order to output the expected amount of data (e.g., 128 bits) from the virtual planes. In the example shown in FIG. 5, column selects associated with one physical plane may be suppressed to prevent the memory from providing extra bits of data. When one or more column selects of a column plane are suppressed, it may be referred to as suppressing the column plane.

The dashed boxes in table 500 indicate the column selects of a physical plane that are suppressed during a memory access operation. For example, say CS0, CS1, CS2, and/or CS3 are activated (e.g., by a column decoder, such as 245 in FIG. 2). For virtual plane CP0, the data associated with CS0:3 is located in MD0, not in physical plane CP0. Accordingly, CS0, CS1, CS2, and CS3 of physical plane CP0 is suppressed. In another example, say CS52, CS53, CS54, and/or CS55 are activated. For virtual plane CP13, the data associated with CS52:55 is located in MD0, not in physical plane CP13. Accordingly, CS52, CS53, CS54, and CS55 of physical plane CP13 is suppressed.

However, to avoid losing addressable array space, data for the virtual planes is stored in the locations associated with the suppressed column selects of the physical planes. The suppressed column selects are remapped to CS56:59. In some embodiments, the remapping may be performed by a column decoder (e.g., column decoder 245). For example, returning to virtual plane CP0, when CS0:3 are activated, data is provided from MD0. However, when CS56:59 are activated, data from CS0:3 of physical CP0 is provided for virtual CP0. In another example, when CS52:55 is activated, data from M0 is provided for virtual CP13, and when CS56:59 are activated, data from CS52:55 of physical CP13 is provided for virtual CP13.

All of the column select signals of the metadata plane MD0 are "lent" to virtual data planes in the MD8 ON mode. Accordingly, all of the column selects of the physical metadata plane are associated with virtual planes, and none of the column selects in the metadata plane are suppressed. In the example shown in FIG. 5, all of the data for virtual CP15 is stored in physical CP15. Accordingly, no suppression of column selects is required for physical CP15. Similarly, no suppression of column selects in the physical ECC plane or metadata plane MD1 are provided.

By suppressing column selects in physical column planes and remapping data stored in the physical column planes to different column selects as shown in FIG. 5, sixteen virtual data planes are formed from seventeen column planes (physical CP0-15 and MD0). Accordingly, additional data can be stored in the memory array, and a controller interacting with the memory device receives the expected amount of data and metadata (128 bits+8 bits).

FIG. 6 shows a table indicating organization of the bank of the memory array and physical column plane suppression scheme according to some embodiments of the present disclosure. The organization depicted in table 500 may be used when a memory device (e.g., one or more of memory devices 104 and/or memory device 200) is in an operating mode where no metadata is stored (MD OFF).

The first three rows in table 600 are the same as table 400 and table 500. The first column of table 600 is also the same as table 400 and table 500. However, unlike the previous tables, there are no unused column select signals in table 600.

When no metadata is stored in the memory device, more space in the memory array is available for storing data. However, because of the allocation of the column selects, additional data cannot be stored in the physical data column planes. Rather, the additional data is stored in the metadata planes MD0 and MD1. In order for a controller (e.g., controller 106, controller 202) to receive the number of data bits expected (e.g., 128 data bits), the activation of the column selects are adjusted to form 16 virtual data planes (virtual planes) each associated with 64 CS. In the example shown, MD0 "lends" two sets of column select signals to each of the virtual data planes CP0-6 and one set of column select signals to virtual data plane CP7. MD1 "lends" two sets of column select signals to each of the virtual data planes CP8-14 and one set of column select signals to virtual data plane CP15. For example, CS0:7 of MD0 is "borrowed" by virtual CP0, CS8:15 of MD0 is borrowed by virtual CP1, CS0:7 of MD1 is borrowed by virtual CP8, and so on.

During operation, the column select signals for one or more physical column planes may be suppressed in order to output the expected amount of data (e.g., 128 bits) from the virtual planes. In the example shown in FIG. 6, column selects associated with two physical planes may be suppressed to prevent the memory from providing extra bits of data.

The dashed boxes in table 600 indicate the column selects of a physical plane that are suppressed during a memory access operation. For example, say CS0, CS1, CS2, CS3, CS4, CS5, CS6, and/or CS7 are activated (e.g., by a column decoder, such as 245 in FIG. 2). For virtual plane CP0, the data associated with CS0:7 is located in MD0, not in physical plane CP0. Accordingly, CS0:7 of physical plane CP0 is suppressed. Further, for virtual plane CP8, the data associated with CS0:7 is located in MD1, not in physical plane CP8. Accordingly, CS0:7 of physical plane CP8 is suppressed. Similarly, the data associated with CS56:59 of virtual plane CP7 is located in MD0, not physical plane CP7, and the data associated with CS56:59 of virtual plane CP15 is located in MD1, not physical plane CP15. Accordingly, CS56:59 of physical planes CP7 and CP15 are suppressed. Note that in the example shown in FIG. 6, physical planes CP(N) and CP(N+8) are suppressed for a given set of column selects.

However, to avoid losing addressable array space, data for the virtual planes is stored in the locations associated with the suppressed column selects of the physical planes. The suppressed column selects are remapped to CS56:63. For example, returning to virtual plane CP0, when CS0:7 are activated, data is provided from MD0. However, when CS56:63 are activated, data from CS0:7 of physical CP0 is provided for virtual CP0. In another example, when CS40:47 is activated, data from M1 is provided for virtual CP13, and when CS56:63 are activated, data from CS40:47 of physical CP13 is provided for virtual CP13. For physical planes CP7 and CP15, because these physical planes have 60 CS instead of 56, four CS are suppressed and remapped instead of eight.

All of the column select signals of the metadata planes MD0 and MD1 are "lent" to virtual data planes in the MD OFF mode. Accordingly, all of the column selects of the physical metadata planes are associated with virtual planes, and none of the column selects in the metadata planes are suppressed. Similarly, no suppression of column selects in the physical ECC plane is provided.

By suppressing column selects in physical column planes and remapping data stored in the physical column planes to different column selects as shown in FIG. 6, sixteen virtual data planes are formed from eighteen column planes (physical CP0-15, MD0, and MD1). Accordingly, additional data can be stored in the memory array, and a controller interacting with the memory device receives the expected amount of data (128 bits).

Suppressing the column selects as shown in FIGS. 5 and 6 may allow supporting circuitry to also be suppressed such as write drivers and data sense amplifiers in the periphery. Suppressing the additional circuitry may reduce the risk of erroneously reading or writing to the memory array and/or reduce power consumption of the memory device.

Figure 7:
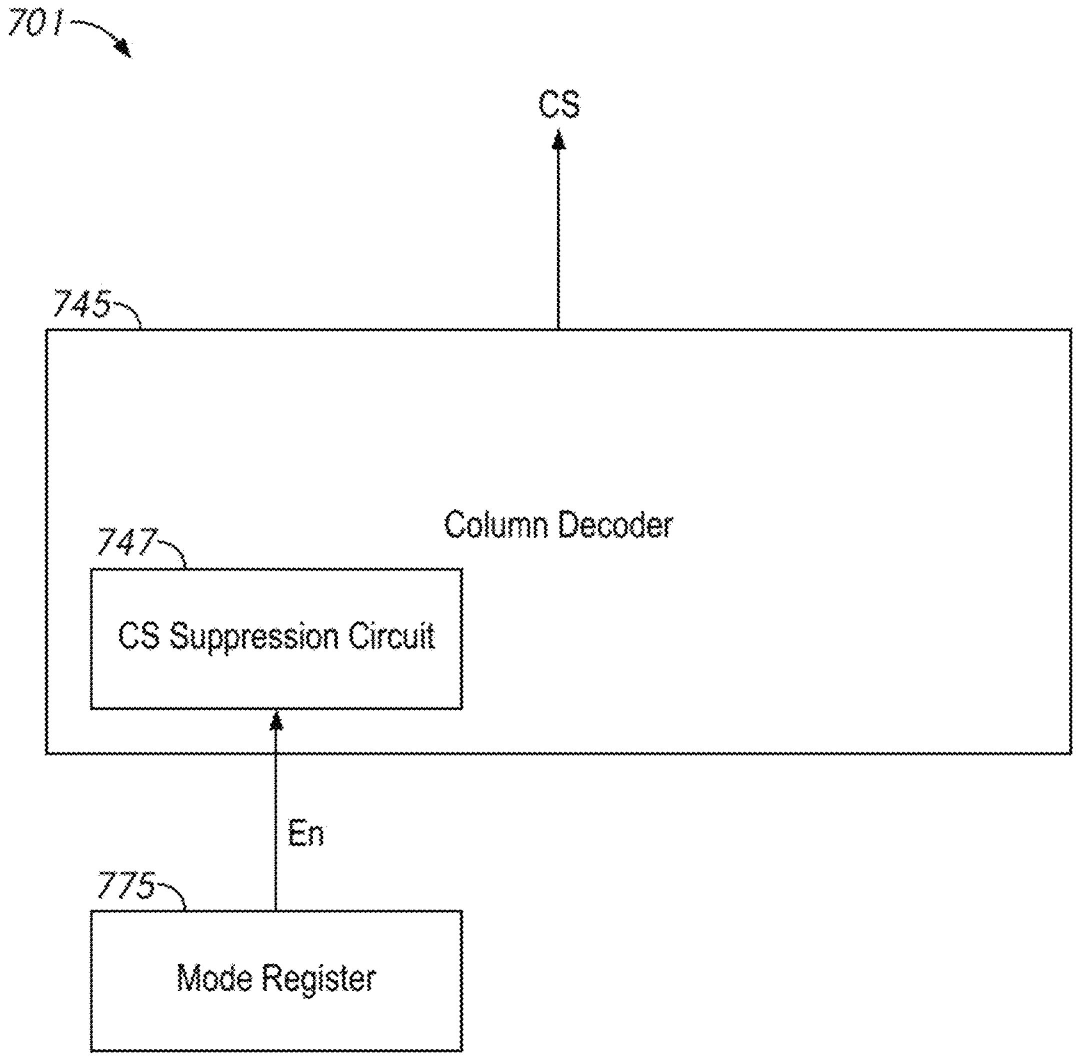
FIG. 7 includes a block diagram of a portion of a memory device according to some embodiments of the present disclosure.

FIG. 7 includes a block diagram of a portion of a memory device according to some embodiments of the present disclosure. Memory device 701 may be included as a portion of one or more of memory devices 104 in FIG. 1 and/or memory device 200 in FIG. 2. Memory device 701 includes a column decoder 745 that includes a column select (CS) suppression circuit. Column decoder 745 may be used to implement or may be included in column decoder 245 in some embodiments. Memory device 701 includes a mode register 775. In some embodiments, the mode register 775 may be used to implement or may be included in mode register 275.

Mode register 775 may be programmed with one or more values to set operating modes and/or parameter for the operation of memory device 701. For example, the mode register 775 may be programmed with a value in a first state that indicates a first amount (e.g., MD16 ON) of metadata is stored in a memory array (e.g., memory array 250). When the first amount of metadata is stored in the memory array, the mode register 775 may provide an inactive enable signal En to the CS suppression circuit 747 such that the column decoder does not suppress the activation of any column selects in physical column planes. The mode register 775 may be programmed with the value in a second state that indicates a second amount of metadata is stored in the memory array (e.g., MD8 ON). Responsive to the second value, the mode register may provide an active En signal to the CS suppression circuit 747 to suppress the column selects of certain physical column planes. The mode register 775 may be programmed with the value in a third state that indicates metadata is not stored in the memory array (e.g., MD OFF). When metadata is not stored in the memory array, the mode register 775 may provide an active En signal to the CS suppression circuit 747 to suppress the column selects of certain physical column planes.

In some embodiments, the En signal may have multiple states to not only enable/disable the CS suppression circuit 747, but to indicate which suppression scheme (e.g., MD8 ON or MD OFF) should be implemented. In another embodiment, there may be multiple En signals to enable/disable different components of the CS suppression circuit 747 as appropriate for the different operation modes (MD16 ON, MD8 ON, MD OFF).

In some embodiments, the CS suppression circuit 747 may include one or more logic circuits to implement a decoding scheme to provide the desired suppression of column selects when enabled. For example, the CS suppression circuit 747 may include decoding logic to implement the suppression scheme described with reference to FIG. 5 and/or FIG. 6. In some embodiments, the CS suppression circuit 747 may include one or more logic circuits that implement a binary decoding schemes.

FIG. 8 shows tables of decoding schemes according to some embodiments of the present disclosure. In some embodiments, the decoding scheme shown in tables 800 and table 802 of FIG. 8 may be implemented by the memory device 701 shown in FIG. 7. Table 800 is an example decoding scheme that may be used to implement the suppression scheme shown in FIG. 5 (MD8 ON) and table 802 is an example decoding scheme that may be used to implement the suppression scheme shown in FIG. 6 (MD OFF).

The first column of table 800 and table 802 indicates the column select signals (CS). The next six columns indicate the binary inputs to be decoded. The final column indicates the physical column plane (CP) for which the indicated CS is suppressed. The first four inputs (the columns labeled 5-2) may be used to indicate the physical column plane to be suppressed.

For table 800, the CS suppression circuit 747 may use the first four inputs to determine the physical column plane to suppress CS activation for a particular CS. For example, in the row for CS0:3, the inputs are "0000." Accordingly, as indicated by the final column, CS activation in physical CP0 is suppressed when CS0, CS1, CS2, or CS3 is selected for activation. This matches FIG. 5, where CS0-3 of CP0 are blocked out. While '1111' is shown for CS60:63 in table 800, this set of column selects are never suppressed because CS60:63 are not assigned to any virtual planes in MD8 ON mode. Thus, addresses associated with CS60:63 are invalid.

For table 802, the CS suppression circuit 747 may use the first three inputs (the columns labeled 5-3) to determine the physical column planes to suppress for a given set of column selects for CS0:59. For CS60-63, the CS suppression circuit 747 may use the first four inputs (the columns labeled 5-2) to determine the physical column planes to suppress. For CS0:55, the CS suppression circuit 747 may use the provided input to determine a first physical plane to suppress and add eight to obtain the second physical plane to suppress. For example, for CS8:11, the input is '001' (columns 5-3). This corresponds to CP1. Adding eight, this corresponds to CP9. Thus, for CS8:11, CP1 and CP9 will be suppressed. Similarly, for CS12:15, the input is '001' (columns 5-3), corresponding to CP1 and CP9. This matches FIG. 6 where CP1 and CP9 are suppressed for CS8:15.

For CS56:59, the input is '111' (column 5-3), which corresponds to CP7. Adding eight, this corresponds to CP15. Thus, for CS56:59, CP7 and CP15 are suppressed. Again, this matches the suppression shown in FIG. 6.

For CS60:63, the first four inputs are used, which is '1111.' This is used to indicate that the column selects for the metadata planes are suppressed (MD0 and MD1). CS60:63 are not assigned to the metadata planes because the metadata planes only have 60 CS assigned. However, because portions of the physical data planes CP0-15 have been remapped to CS60:63, these addresses may exist for the physical metadata planes. Accordingly, to prevent accidental access of the memory array and/or unnecessary activation of sense amplifiers and word drivers, the decoding scheme provides for suppression of the metadata planes by the CS suppression circuit 747.

Any suitable logic circuits may be used to implement table 800 and 802 in CS suppression circuit 747. In some embodiments, the remaining two inputs (the columns labeled 1-0) may be omitted. In other embodiments, the remaining to inputs may be used to provide additional information to the CS suppression circuit 747 and/or other components of the column decoder 745.

Figure 9:
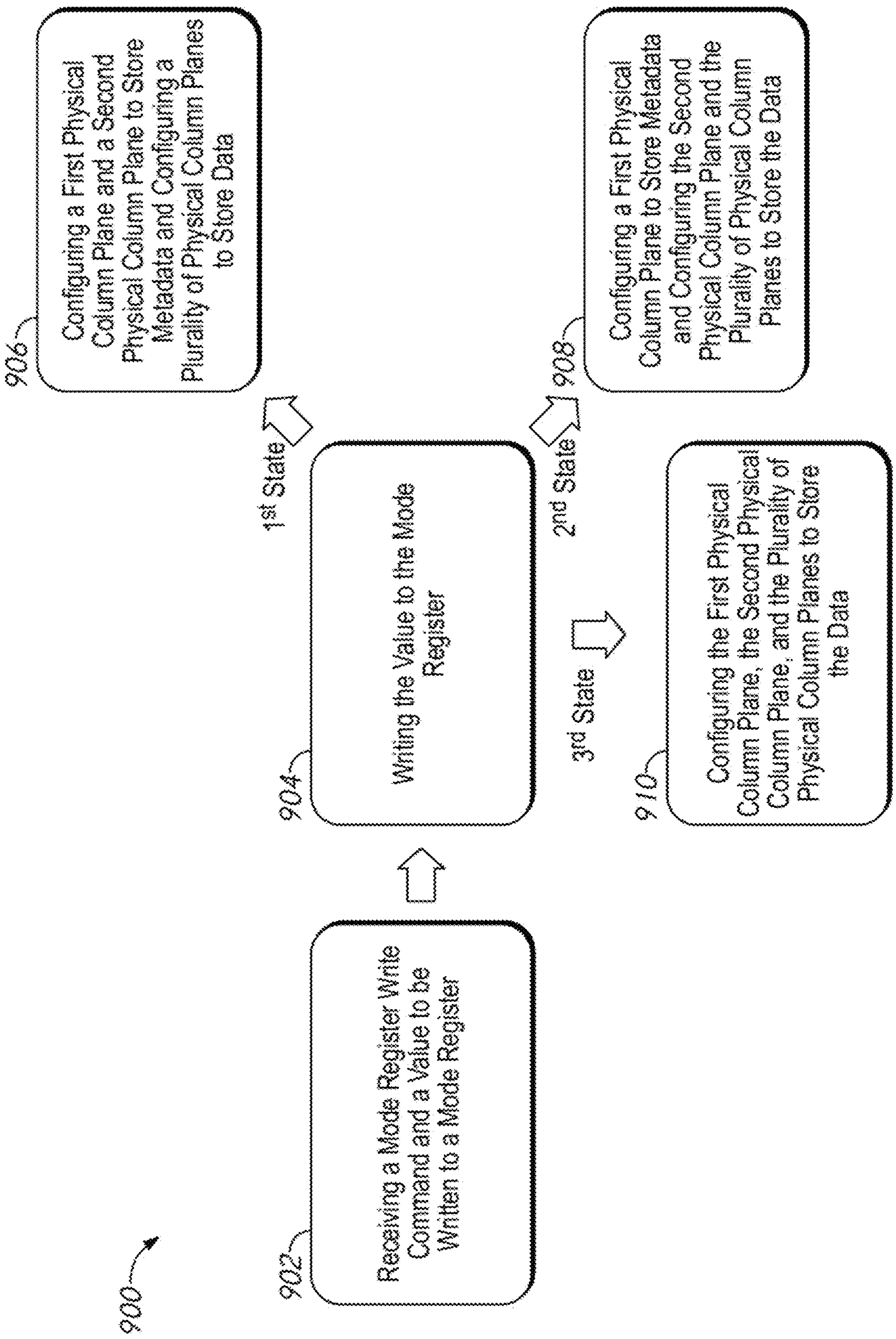
FIG. 9 is a flow chart of a method according to embodiments of the present disclosure.

FIG. 9 is a flow chart of a method according to embodiments of the present disclosure. The method shown in flow chart 900 may be performed in whole or in part by a computing system, such as computing system 100 shown in FIG. 1, a device, such as one or more of memory devices 104 in FIG. 1, memory device 200 shown in FIG. 2, memory device 300 shown in FIG. 3, and/or memory device 701 shown in FIG. 7.

At block 902, "receiving a mode register write command and a value to be written to a mode register" may be performed. In some embodiments, the mode register write command and value may be provided to a memory device by a controller. Responsive to the mode register write command, at block 904, "writing the value to the mode register" may be performed.

When the value is a first state, at block 906 "configuring a first physical column plane and a second physical column plane to store metadata and configuring a plurality of physical column planes to store data" may be performed. When the value is a second state, at block 908 "configuring the first physical column plane to store metadata and configuring the second physical column plane and the plurality of physical column planes to store the data" may be performed. When the value is a third state, block 910 "configuring the first physical column plane, the second physical column plane, and the plurality of physical column planes to store the data" may be performed.

In some embodiments, configuring the second physical column plane and the plurality of physical column planes to store the data may include configuring the first physical column plane and the plurality of physical column planes into a plurality of virtual planes. In some embodiments, each of the plurality of virtual planes are associated with sixty column select signals.

In some embodiments, configuring the first physical column plane, the second physical column plane, and the plurality of physical column planes to store the data may include configuring the first physical column plane, the second physical column plane, and the plurality of physical column planes into a plurality of virtual planes. In some embodiments, each of the plurality of virtual planes are associated with sixty-four column select signals. In some embodiments, at least some of the plurality of virtual planes are associated with column select signals from at least two different physical column planes. For example, as shown in FIG. 5, data for virtual planes CP0-14 are stored in one of physical CP0-14 and MD0. In some embodiments, all of the plurality of virtual planes are associated with column select signals from at least two different physical column planes. For example, as shown in FIG. 6, data for virtual planes CP0-15 are stored in one of physical CP0-15 and also in MD0 or MD1.

Optionally, the method in flow chart 900 may further include providing an active column select signal from a column decoder to the first physical column plane, the second physical column plane, and at least one of the plurality of physical column planes when the value is the first state.

Figure 10:
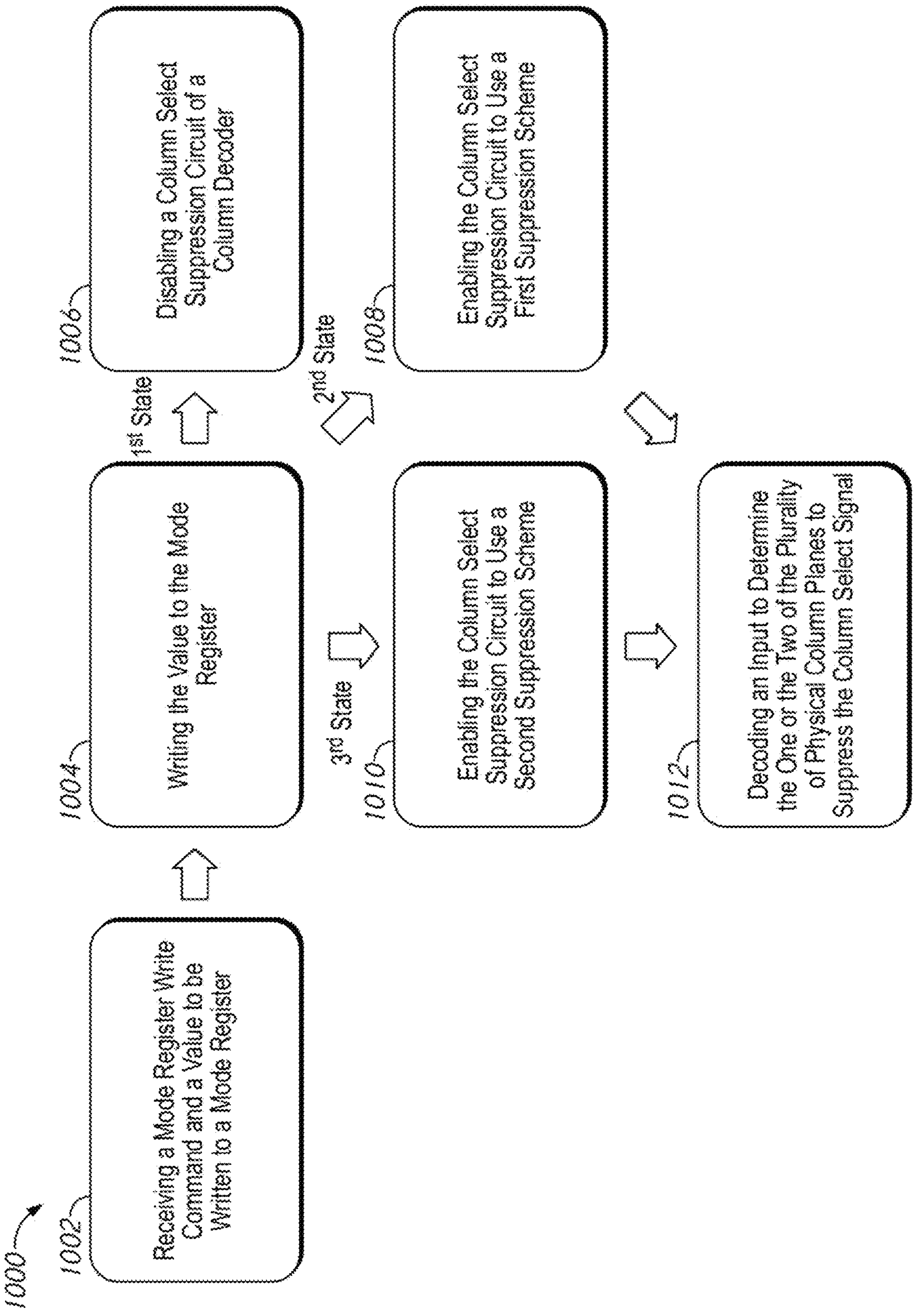
FIG. 10 is a flow chart of a method according to embodiments of the present disclosure.

FIG. 10 is a flow chart of a method according to embodiments of the present disclosure. The method shown in flow chart 1000 may be performed in whole or in part by a computing system, such as computing system 100 shown in FIG. 1, a device, such as one or more of memory devices 104 in FIG. 1, memory device 200 shown in FIG. 2, memory device 300 shown in FIG. 3, and/or memory device 701 shown in FIG. 7.

At block 1002, "receiving a mode register write command and a value to be written to a mode register" may be performed. In some embodiments, the mode register write command and value may be provided to a memory device by a controller. Responsive to the mode register write command, "writing the value to the mode register" may be performed at block 1004.

When the value is a first state, at block 1006, "disabling a column select suppression circuit of a column decoder" may be performed. For example, column select suppression circuit 747.

When the value is a second state, at block 1008, "enabling the column select suppression circuit to use a first suppression scheme" may be performed. In some embodiments, the first suppression scheme causes the column select suppression circuit to selectively suppress a column select signal of one of a plurality of physical column planes. For example, as shown in FIG. 5 and table 800 in FIG. 8.

When the value is a third state, at block 1010, "enabling the column select suppression circuit to use a second suppression scheme" may be performed. In some embodiments, the second suppression scheme causes the column select suppression circuit to selectively suppress the column select signal of two of the plurality of physical column planes. For example, as shown in FIG. 6 and table 802 of FIG. 8.

In some embodiments, the method shown in flow chart 1000 may further include remapping data associated with the column select signal to another column select signal when the value is the second state or the third state. In some embodiments, the remapping may be performed by a column decoder (e.g., column decoder 245) and/or another component of the memory device. In some embodiments, remapping data may include remapping data associated with eight column select signals to a different eight column select signals. For example, as shown in FIG. 6, data for virtual planes CP0-6 and CP8-14 associated with suppressed column select signals of the physical planes are remapped to unassigned column select signals. In some embodiments, remapping data includes remapping data associated with four column select signals to a different four column select signals. For example, as shown in FIG. 5, data for virtual planes CP0-14 associated with suppressed column select signals of the physical column planes are remapped to unassigned or unused column select signals. Further, as shown in FIG. 6, data for virtual planes CP7 and CP15 are remapped to unassigned column select signals.

In some embodiments, at block 1012 "decoding an input to determine the one or the two of the plurality of physical column planes to suppress the column select signal" may be performed. In some embodiments, the decoding may be performed by a column select suppression circuit. In some embodiments, block 1012 may occur when the value is the second state or the third state. In some embodiments, the input ma include a plurality of binary values.

In some embodiments, the method shown in flow chart 1000 may further include when the value is the second state, arranging seventeen of the plurality of physical column planes into sixteen virtual column planes, and when the value is the third state, arranging eighteen of the plurality of physical column planes into the sixteen virtual column planes.

In some embodiments, the method shown in flow chart 1000 may further include when the value is the third state, configuring the eighteen of the plurality of physical column planes to store data, when the value is the second state, configuring one of the plurality of physical column planes to store metadata and configuring the seventeen of the plurality of physical column planes to store data, and when the value is the first state, configuring two of the plurality of physical column planes to store metadata and configuring sixteen of the plurality of physical column planes to store data.

Apparatuses, methods, and systems disclosed herein may provide a memory array that is selectively configurable to store multiple amounts of metadata as well as no metadata. This may allow a single memory device to meet the needs of multiple types of users. Further, users can reconfigure the single memory device to meet changing or different needs without having to purchase multiple types of memory devices.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. An apparatus comprising:

a memory array including a bank, wherein the bank includes a first physical column plane, a second physical column plane, and a plurality of physical column planes;

a mode register configured to store a value, wherein when the value is a first state, the first physical column plane and the second physical column plane are configured to store metadata and the plurality of physical column planes are configured to store data, wherein when the value is a second state, the first physical column plane is configured to store the metadata and the second physical column plane and the plurality of physical column planes are configured to store the data, wherein when the value is a third state, the first physical column plane, the second physical column plane, and the plurality of physical column planes are configured to store the data; and a column decoder configured to selectively suppress a column select signal of one of the plurality of physical column planes when the value is the second state and selectively suppress the column select signal of two of the plurality of physical column planes or the first and second physical column planes when the value is the third state.

2. The apparatus of claim 1, wherein the column decoder comprises a column select suppression circuit configured to receive a plurality of inputs, wherein the one or ones of the plurality of physical column planes or the first and second physical column planes where the column select signal is suppressed is based, at least in part, on the plurality of inputs.

3. The apparatus of claim 2, wherein a number of the inputs comprises four binary inputs.

4. The apparatus of claim 3, wherein when the value is in the second state, the four binary inputs indicates which one of the plurality of physical column planes to suppress the column select signal.

5. The apparatus of claim 3, wherein when the value is the third state, three of the four binary inputs indicates a first suppressed column plane and the column select suppression circuit is configured to add eight to determine a second suppressed column plane for a first plurality of column select signals, and for a second plurality of column select signals, the four binary inputs indicate the first and second physical column planes are suppressed.

6. The apparatus of claim 1, wherein each of the plurality of physical column planes are associated with a plurality of column select signals.

7. The apparatus of claim 6, wherein when the value is the second state or the third state, data associated with a subset of the plurality of column select signals are remapped to a different subset of the plurality of column select signals.

8. The apparatus of claim 1, wherein the mode register is configured to provide a signal to enable a column select suppression circuit of the column decoder when the value is the second state or the third state and disable the column select suppression circuit when the value is the first state.

9. The apparatus of claim 1, wherein a number of the plurality of physical column planes is sixteen.

10. A system comprising:

a controller; and a memory module comprising a plurality of memory devices, wherein at least one memory device of the plurality of memory devices comprises:

a memory array including a bank, wherein the bank includes a first physical column plane, a second physical column plane, and a plurality of physical column planes;

a mode register configured to store a value, wherein when the value is a first state, the first physical column plane and the second physical column plane are configured to store metadata and the plurality of physical column planes are configured to store data, wherein when the value is a second state, the first physical column plane is configured to store the metadata and the second physical column plane and the plurality of physical column planes are configured to store the data, wherein when the value is a third state, the first physical column plane, the second physical column plane, and the plurality of physical column planes are configured to store the data; and a column decoder configured to selectively suppress a column select signal of one of the plurality of physical column planes when the value is the second state and selectively suppress the column select signal of two of the plurality of physical column planes or the first and second physical column planes when the value is the third state.

11. The system of claim 10, wherein the controller is configured to cause the value to be written in the first state, the second state, or the third state.

12. The system of claim 10, wherein the column decoder comprises a column select suppression circuit configured to be enabled and disabled based on the value stored in the mode register.

13. The system of claim 12, wherein the column select suppression circuit is further configured to use a first suppression scheme or a second suppression scheme when enabled based on the value stored in the mode register.

14. The system of claim 12, wherein the column select suppression circuit is disabled when the value is the first state.

15. The system of claim 10, wherein the at least one memory device comprises a x8 memory device.

16. The system of claim 10, wherein the controller is configured to provide a column address to the at least one memory device, and wherein the at least one memory device comprises a x4 memory device and a first subset of the plurality of physical column planes provide the data when a bit of the column address is a first state, and a second subset of the plurality of physical column planes provide the data when the bit of the column address is a second state, wherein the first and second subsets are exclusive.

17. The system of claim 10, wherein the column decoder remaps data associated with a first subset of a plurality of column selects of one of the plurality of physical column planes to a second subset of the plurality of column selects of the plurality of physical column planes when the value is the second state or the third state.

18. The system of claim 10, wherein from the controller, the bank appears to have sixteen column planes configured to store data regardless of the value stored in the mode register.

* * * * *